United States Patent
DeLara (10) Patent No.: US 6,877,991 B2
(45) Date of Patent: Apr. 12, 2005

(54) PATCH PANEL PROVIDING 64-PIN CONNECTORS

(75) Inventor: Gilberto DeLara, Lilburn, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/461,532

(22) Filed: Jun. 12, 2003

(65) Prior Publication Data

US 2004/0253878 A1 Dec. 16, 2004

(51) Int. Cl.⁷ .............................................. H01R 29/00
(52) U.S. Cl. ....................................................... 439/49
(58) Field of Search .............................. 439/49, 50–54, 439/638, 639; 331/181–185; 379/326, 332; 361/826, 828; 385/15, 17, 16

(56) References Cited

U.S. PATENT DOCUMENTS

| | | | |
|---|---|---|---|
| 3,990,763 A | 11/1976 | Kress | 339/155 |
| 4,764,849 A | 8/1988 | Khan | 361/428 |
| 5,562,499 A | * 10/1996 | Minich | 439/620 |
| 5,599,191 A | 2/1997 | DeLara | 439/49 |

* cited by examiner

Primary Examiner—Alex Gilman
(74) Attorney, Agent, or Firm—Cantor Colburn LLP (57) ABSTRACT

A connection panel comprising a frame member and a plurality of first terminals provided on the frame member. The first terminals are arranged in a horizontal row on the frame member, are identical and are each a sixty-four position standard type of terminal. The connection panel also comprises a plurality of second terminals provided on the frame member. The second terminals are arranged in a horizontal row on the frame member and have a position layout that is the same as a position layout of the standard type of terminal. Each of the second terminals is a sixty-four position standard type of terminal. The connection panel further comprises connections disposed within the frame member providing electrical connections between the first terminals and the second terminals.

23 Claims, 6 Drawing Sheets

FIG. 6
012026 PATCH PANEL WIRING

FIG. 7

| PR | COLOR CODE | REVERSED 64POS M P1 | RJ45 P2 |
|---|---|---|---|
| | WIRING CHART | | |
| 1 | WHITE/BLUE | 33 | 2 |
| | BLUE/WHITE | 1 | 1 |
| 2 | WHITE/ORANGE | 34 | 5 |
| | ORANGE/WHITE | 2 | 4 |
| 3 | WHITE/GREEN | 35 | 2 |
| | GREEN/WHITE | 3 | 1 |
| 4 | WHITE/BROWN | 36 | 5 |
| | BROWN/WHITE | 4 | 4 |
| 5 | WHITE/SLATE | 37 | 2 |
| | SLATE/WHITE | 5 | 1 |
| 6 | RED/BLUE | 38 | 5 |
| | BLUE/RED | 6 | 4 |
| 7 | RED/ORANGE | 39 | 2 |
| | ORANGE/RED | 7 | 1 |
| 8 | RED/GREEN | 40 | 5 |
| | GREEN/RED | 8 | 4 |
| 9 | RED/BROWN | 41 | 2 |
| | BROWN/RED | 9 | 1 |
| 10 | RED/SLATE | 42 | 5 |
| | SLATE/RED | 10 | 4 |
| 11 | BLACK/BLUE | 43 | 2 |
| | BLUE/BLACK | 11 | 1 |
| 12 | BLACK/ORANGE | 44 | 5 |
| | ORANGE/BLACK | 12 | 4 |
| 13 | BLACK/GREEN | 45 | 2 |
| | GREEN/BLACK | 13 | 1 |
| 14 | BLACK/BROWN | 46 | 5 |
| | BROWN/BLACK | 14 | 4 |
| 15 | BLACK/SLATE | 47 | 2 |
| | SLATE/BLACK | 15 | 1 |
| 16 | YELLOW/BLUE | 48 | 5 |
| | BLUE/YELLOW | 16 | 4 |
| 17 | YELLOW/ORANGE | 49 | 2 |
| | ORANGE/YELLOW | 17 | 1 |
| 18 | YELLOW/GREEN | 50 | 5 |
| | GREEN/YELLOW | 18 | 4 |
| 19 | YELLOW/BROWN | 51 | 2 |
| | BROWN/YELLOW | 19 | 1 |
| 20 | YELLOW/SLATE | 52 | 5 |
| | SLATE/YELLOW | 20 | 4 |
| 21 | VIOLET/BLUE | 53 | 2 |
| | BLUE/VIOLET | 21 | 1 |
| 22 | VIOLET/ORANGE | 54 | 5 |
| | ORANGE/VIOLET | 22 | 4 |
| 23 | VIOLET/GREEN | 55 | 2 |
| | GREEN/VIOLET | 23 | 1 |
| 24 | VIOLET/BROWN | 56 | 5 |
| | BROWN/VIOLET | 24 | 4 |
| 25 | VIOLET/SLATE | 57 | 2 |
| | SLATE/VIOLET | 25 | 1 |
| 26 | WHITE/BLUE | 58 | 5 |
| | BLUE/WHITE | 26 | 4 |
| 27 | WHITE/ORANGE | 59 | 2 |
| | ORANGE/WHITE | 27 | 1 |
| 28 | WHITE/GREEN | 60 | 5 |
| | GREEN/WHITE | 28 | 4 |
| 29 | WHITE/BROWN | 61 | 2 |
| | BROWN/WHITE | 29 | 1 |
| 30 | WHITE/SLATE | 62 | 5 |
| | SLATE/WHITE | 30 | 4 |
| 31 | RED/BLUE | 63 | 2 |
| | BLUE/RED | 31 | 1 |
| 32 | RED/ORANGE | 64 | 5 |
| | ORANGE/RED | 32 | 4 | ns.
PATCH PANEL PROVIDING 64-PIN CONNECTORS

BACKGROUND OF THE INVENTION

The present disclosure relates generally to an electrical connecting device and in particular, to a connecting device for use in connecting telecommunications signal lines with a switching device.

Many existing telecommunication switching devices include terminals for directly connecting incoming and outgoing telecommunication signal cabling directly to the switching device. However, new switching devices have been introduced with a modular design in which a variable number of card units are included, with the card units oriented in a vertical direction. An example of a modular designed switching device is the CBX500 ATM switch manufactured by Lucent Technologies. In this switching device, connections to the card units are made via ports arranged in vertical columns, with each column of ports corresponding to a respective card unit. The ports provided in such a switching device are not conveniently arranged for connection with incoming and outgoing signal cables. Although a patch connection panel of conventional design could be interposed between the ports of the switch device and the incoming and outgoing cables, utilizing a conventional patch panel would result in an inconvenient, cluttered, confusing and less economical cabling arrangement.

Another type of electrical connecting device currently available is a patch panel with fifty pin connectors that may be utilized as a telecommunication switching device. However, the patch panel with fifty pin connectors limits the number of DS1 circuits (DS1 stands for "Digital Signal One" and represents a digital signal rate of 1.544 megabytes) to twenty-five for each transmit/receive cable set. In applications where more than twenty-five circuits are required, another fifty pin connector and an additional transmit/receive cable set is required. This may result in requiring a total of four cables to support thirty-two DS1 circuits.

BRIEF DESCRIPTION OF THE INVENTION

An embodiment of the present invention is a connection panel comprising a frame member and a plurality of first terminals provided on the frame member. The first terminals are arranged in a horizontal row on the frame member, are identical and are each a sixty-four pin standard type of terminal. The connection panel also comprises a plurality of second terminals provided on the frame member. The second terminals are arranged in a horizontal row on the frame member and have a position layout that is the same as the standard type of terminal. Each of the second terminals is a sixty-four pin standard type of terminal. The connection panel further comprises connections disposed within the frame member providing electrical connections between the first terminals and the second terminals.

Another embodiment of the present invention is a connection panel comprising a frame member and fourteen sixty-four-position telephone company standard terminals provided on a first side of the frame member in a horizontal row. The connection panel also comprises fourteen sixty-four-position telephone company standard terminals provided in a horizontal row on a second side of the frame member. The connection panel further comprises connections disposed within the frame member providing electrical connections between the first terminals and the second terminals.

A further embodiment of the present invention is a connection panel comprising a housing having a front side and a rear side different from the front side. The connection panel also comprises a plurality of first terminals provided on the front side of the housing. The first terminals are all identical and are each a sixty-four pin standard type of terminal. The connection panel further comprises a plurality of second terminals provided on the rear side of the housing. The second terminals all have a position layout that is the same as a position layout of the standard type of terminal. Each of the second terminals is a sixty-four pin standard type of terminal. The connection panel further comprises connections disposed within the housing providing electrical connections between the first terminals and the second terminals.

BRIEF DESCRIPTION OF THE DRAWINGS

Referring to the exemplary drawings wherein like elements are numbered alike in the several FIGURES.

DETAILED DESCRIPTION OF THE INVENTION

An exemplary embodiment of the present invention provides a patch panel for facilitating connection between a telecommunication switching device, and incoming and outgoing signal cables. The exemplary patch connection panel permits orderly interconnection between switching device ports arranged in vertical columns and a plurality of incoming and outgoing telecommunication signal channels. In addition, an exemplary embodiment of the present invention provides a connection panel arranged to suppress crosstalk between incoming and outgoing signal paths with a minimum number of cables.

In accordance with an exemplary embodiment of the present invention, the connection panel includes a frame and a plurality of first terminals provided on the frame. The first terminals are all identical, standard types of terminals. The connection panel also includes a second set of terminals provided on the frame. The second set of terminals has the same position layout as the first terminals. The frame includes wiring for interconnecting both sets of terminals. For example, each of the first and second terminals may be a sixty-four position standard telephone company female terminal arranged with two adjacent vertical columns having thirty-two positions in each column. In an exemplary embodiment of the present invention, both sets of terminals are arranged in horizontal rows, with both sets of terminals containing six terminals. In an exemplary embodiment of the present invention, the first terminals are separated from each other by a horizontal distance that is at least as large as five times the width of the terminals, for a pair of terminals; and the second terminals are separated from each other by a horizontal distance that is at least as large as the width of the terminals, for a pair of terminals. The first terminals may be arranged on an opposite side of the frame from the second terminals and the frame is arranged for rack mounting with a height of about five and a quarter (5.25) inches and a width of about twenty-three (23) inches. In this manner, the electrical interference between transmit and receive signals may be eliminated for up to thirty-two DS1 circuits with a minimum number of cables (i.e., two cables).

Figure 1:
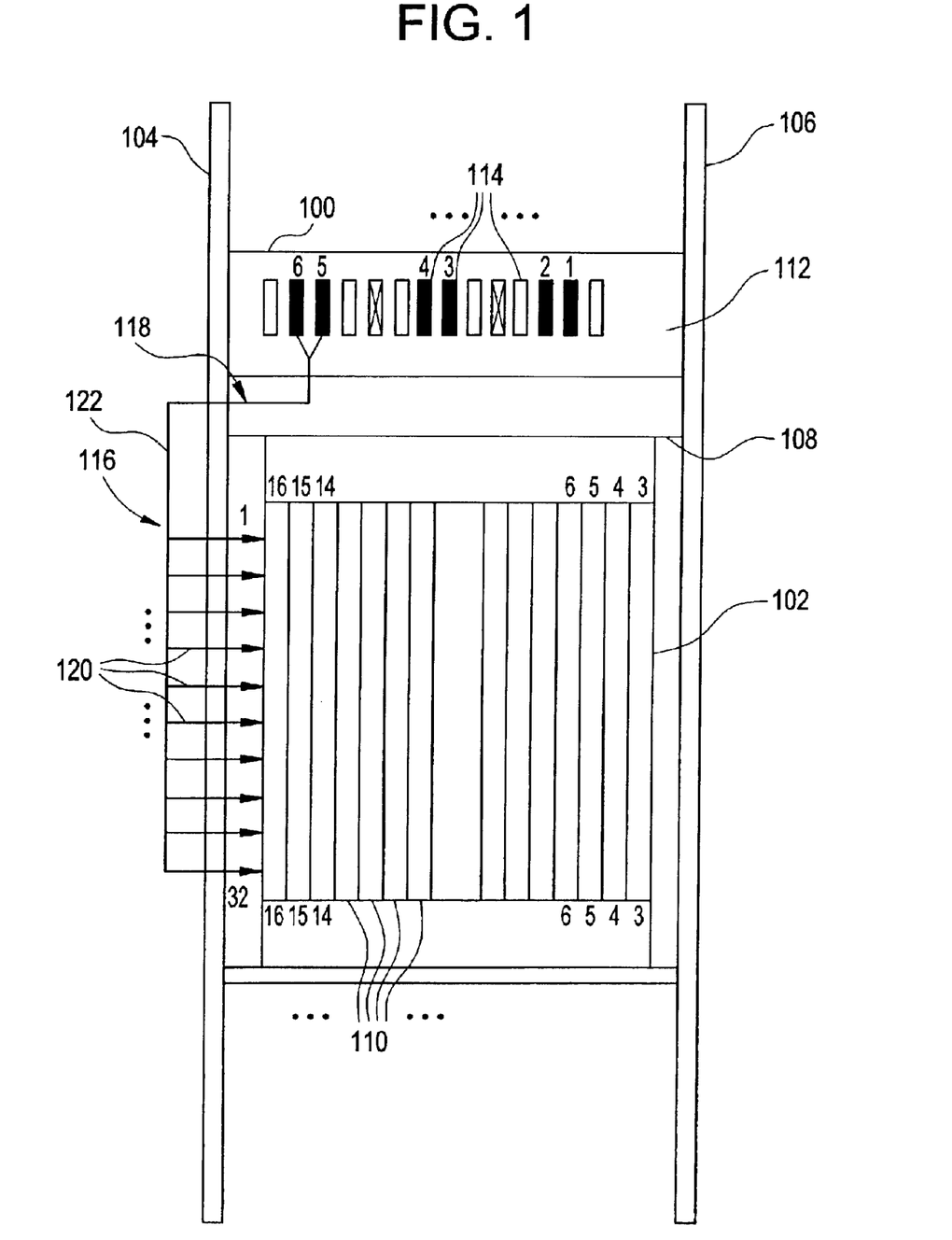
FIG. 1 depicts a connection panel rack-mounted together with a switching device provided in accordance with an exemplary embodiment of the present invention.

FIG. 1 depicts a connection panel 100 rack-mounted with a switching device 102 provided in accordance with an exemplary embodiment of the present invention. The switching device 102 may any switching device known in the art such as the Lucent Technologies Model CBX500. The rack-mounting hardware arrangement for the switching device 102 and the connection panel 100 is schematically represented by a left-side support member 104 and a right-side support member 106, between which the switching device 102 and the panel 100 are mounted.

As shown in FIG. 1, the switching device 102 includes fourteen vertical columns 110 of input/output ports with up to thirty-two ports in a vertical column. As partially indicated in FIG. 1, the columns 110 are numbered from left and right as 16, 15, 14, . . . 4, 3. In order to simplify the drawing, the individual ports making up each vertical column 110 are not separately shown. The connection panel 100 has a front side 112 on which are provided a number of front side terminals 114. In an exemplary embodiment of the present invention six connection terminals are provided to support the expected number of vertical columns for a thirty-two port demand. The number of connection terminals may be expanded to up to fourteen if more are required.

Reference numeral 116 generally indicates a schematic representation of a cable provided to connect a pair of front side terminals 114 of the connection panel 100 with the thirty-two ports in a corresponding column 110 of the switching device 102. In an exemplary embodiment, the cable 116 is of a type commonly referred to as an "octopus" or "Hydra" cable. The cable 116 has two main plugs 118 at one end, adapted to be received by a pair of front side terminals 114 of the connection panel 100. In addition, the cable includes thirty-two secondary plugs 120 branching from the other end of the cable 116 and each adapted to be received by a respective port in the column 110 of I/O ports of the switching device 102.

In an exemplary embodiment of the present invention, each of the front side terminals 114 is of the standard type commonly used in telephone company applications. Each front side terminal 114 includes sixty-four female connection positions provided in two columns of thirty-two positions each (see FIG. 5) Accordingly, the main plugs 118 of the cable 116 are sixty-four pin plugs adapted to connect to the aforesaid standard sixty-four position terminals. Also, the thirty-two ports provided in each column 110 of the switching device 102 may be standard RJ-48C modular connectors, with which the secondary plugs 120 of the cable 116 are compatible. Each of the front side terminals 114 may provide for up to sixteen ports. Therefore, it takes a cable 116 equipped with two main plugs 118, in order to provide for up to thirty-two ports in a column 110 of the switching device 102.

Figure 2:
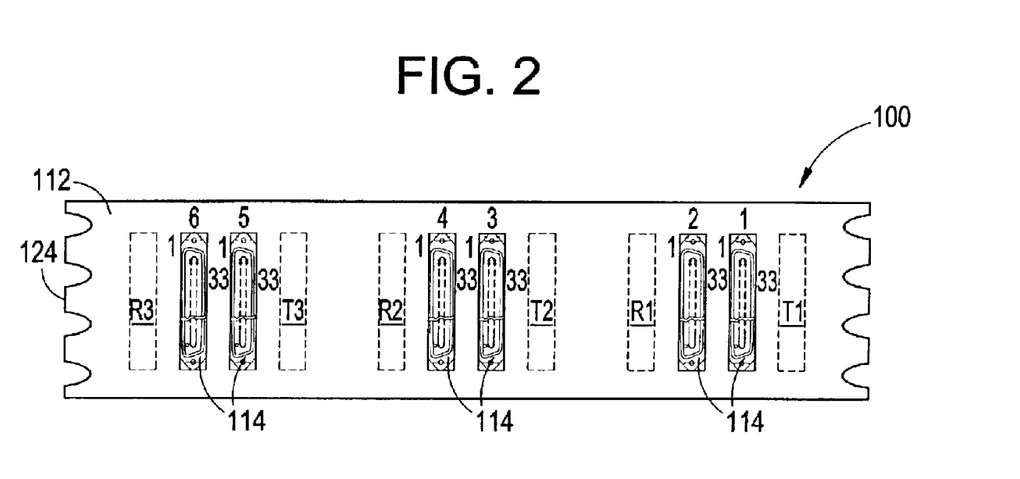
FIG. 2 is a front elevational view of the connection panel provided in accordance with an exemplary embodiment of the present invention.
Figure 3:
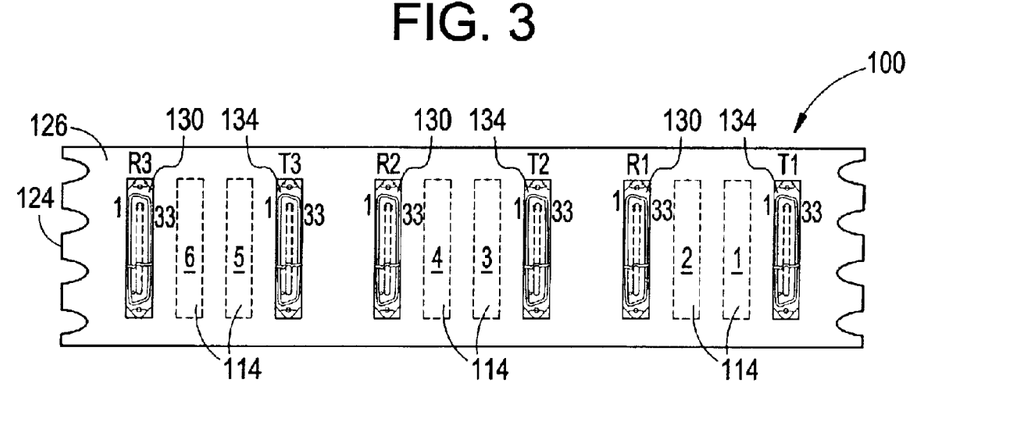
FIG. 3 is an exemplary rear elevational view of the connection panel depicted in FIG. 2.

Additional details of an exemplary embodiment of the connection panel 100 will now be described, initially with reference to FIGS. 2–4. The connection panel 100 includes a main housing or frame member 124 that includes the above-mentioned front side 112 (FIG. 2) and also has a rear side 126 (FIG. 3). Referring to FIG. 2, it will be noted that the above-mentioned six front side terminals 114 are numbered 6, 5, 4, 3, 2 and 1. Referring now to FIG. 3, which is a rear elevational view of the connection panel 100, it will be noted that there is provided on the rear side 126 of the panel 100 a horizontal row with a total of six terminals. Three of these terminals are labeled receive terminals 130 and three of these terminals are labeled transmit terminals 134. This segregation of the receive terminals 130 from the transmit terminals 134 is implemented to prevent or reduce cross-talk between the incoming and outgoing signal lines.

Figure 5:
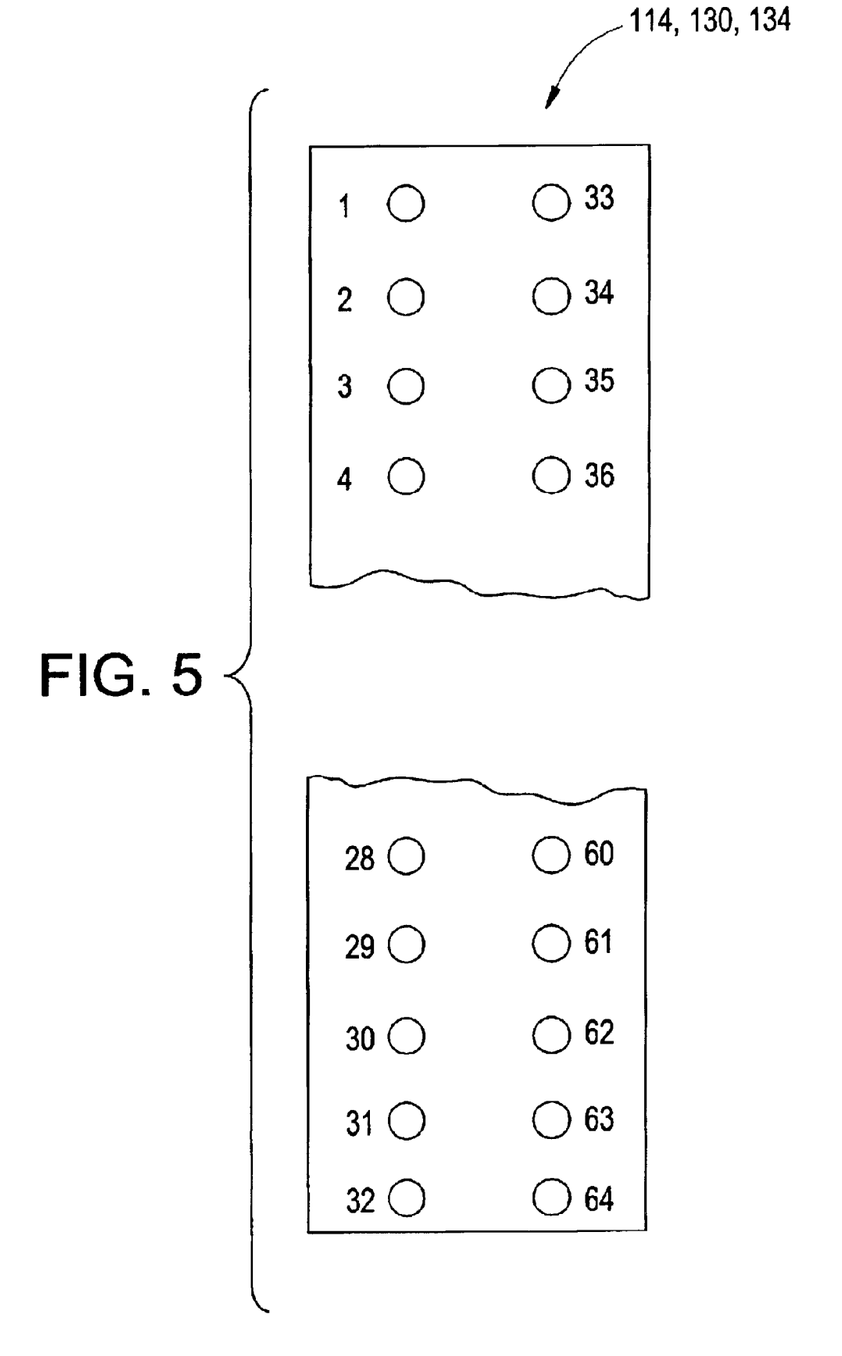
FIG. 5 is an exemplary partial elevational view showing the position layout of one of the connection terminals provided on the front and rear sides of the connection panel depicted in FIG. 2.

All of the transmit terminals 134 and receive terminals 130 are of the same standard type as the previously described front side terminals 114, that standard type having the position layout schematically illustrated in FIG. 5. In particular, "position layout" should be understood to include the predetermined positional relationship among the sixty-four pin female connectors included in each front side terminal 114. In an alternate exemplary embodiment, a male connector terminal having sixty-four pins in the same position layout shown in FIG. 5 is provided.

Continuing to refer to FIG. 3, it will be noted that the front side terminals 114 (used to interface with the switching device) are shown in phantom in FIG. 3 to indicate the relative positions among the front and rear side terminals. In an exemplary embodiment of the present invention, the transmit terminals 134 and receive terminals 130 are displaced sideways from the corresponding front side terminals 114 by a distance that exceeds the width of the standard terminals (e.g., front side terminals 114, transmit terminals 134, receive terminals 130). The horizontal spacing between the transmit terminals 134 and the receive terminals 130 facilitates the wiring (which will be discussed below) between the receive terminals 130 and transmit terminals 134, and the front side terminals 114. It will further be observed that the receive terminals 130 and the transmit terminals 134 are grouped in pairs and numbered from one to three.

Figure 4:
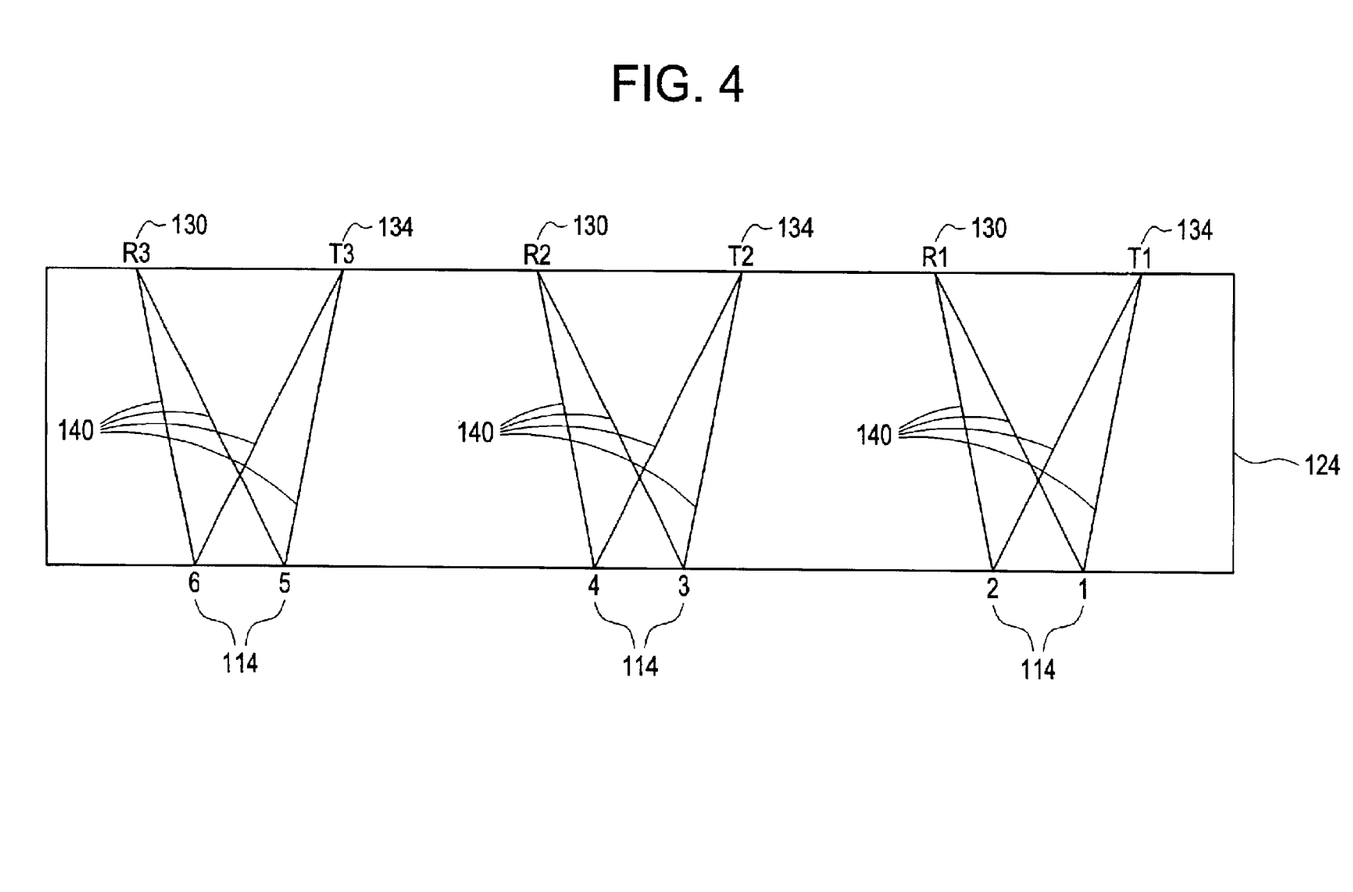
FIG. 4 is an exemplary top view of the connection panel depicted in FIG. 2.
Figure 6:
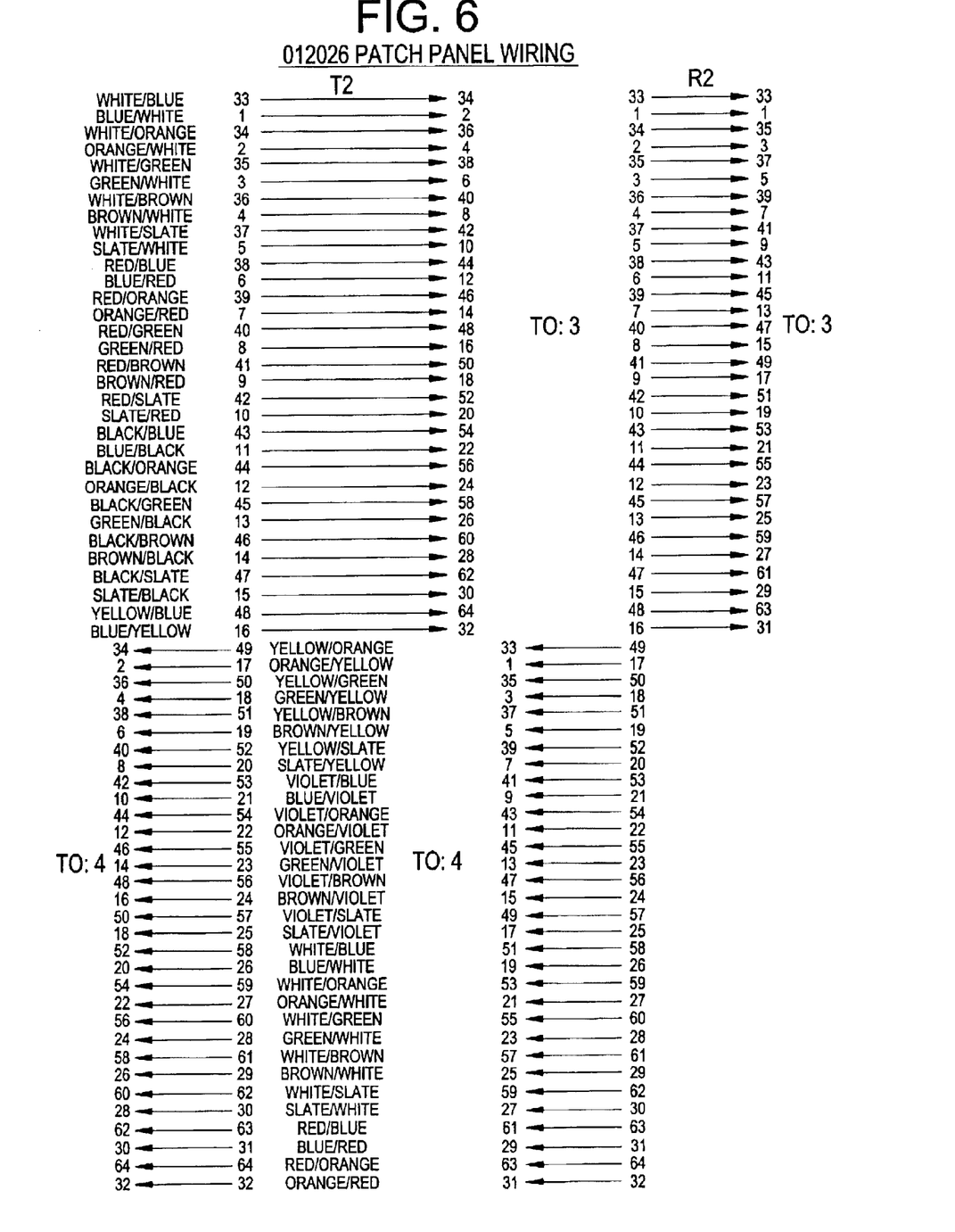
FIG. 6 schematically illustrates exemplary electrical connections between the connection terminals on the front and rear sides of the connection panel provided, within the connection panel depicted in FIG. 2.

FIG. 4, which is a top view of the frame member 124, schematically illustrates the electrical interconnection between the transmit terminals 134 and receive terminals 130, and the front-side (switch interface) terminals 114. In particular, leads 140 are provided within the frame member 124 from the "T1" transmit terminal 134 and the "R1" receive terminal 130 to the front side terminals 114 "1" and "2"; from the "T2" transmit terminal 134 and the "R2" receive terminal 130 to the front side terminals 114 "3" and "4"; and so forth. Typical pin-by-pin wiring from the transmit terminals 134 and the receive terminals 130 to the front side terminals 114 is schematically illustrated in FIG. 6, as well as the pin-out arrangement from the front-side terminals 114.

Figure 7:
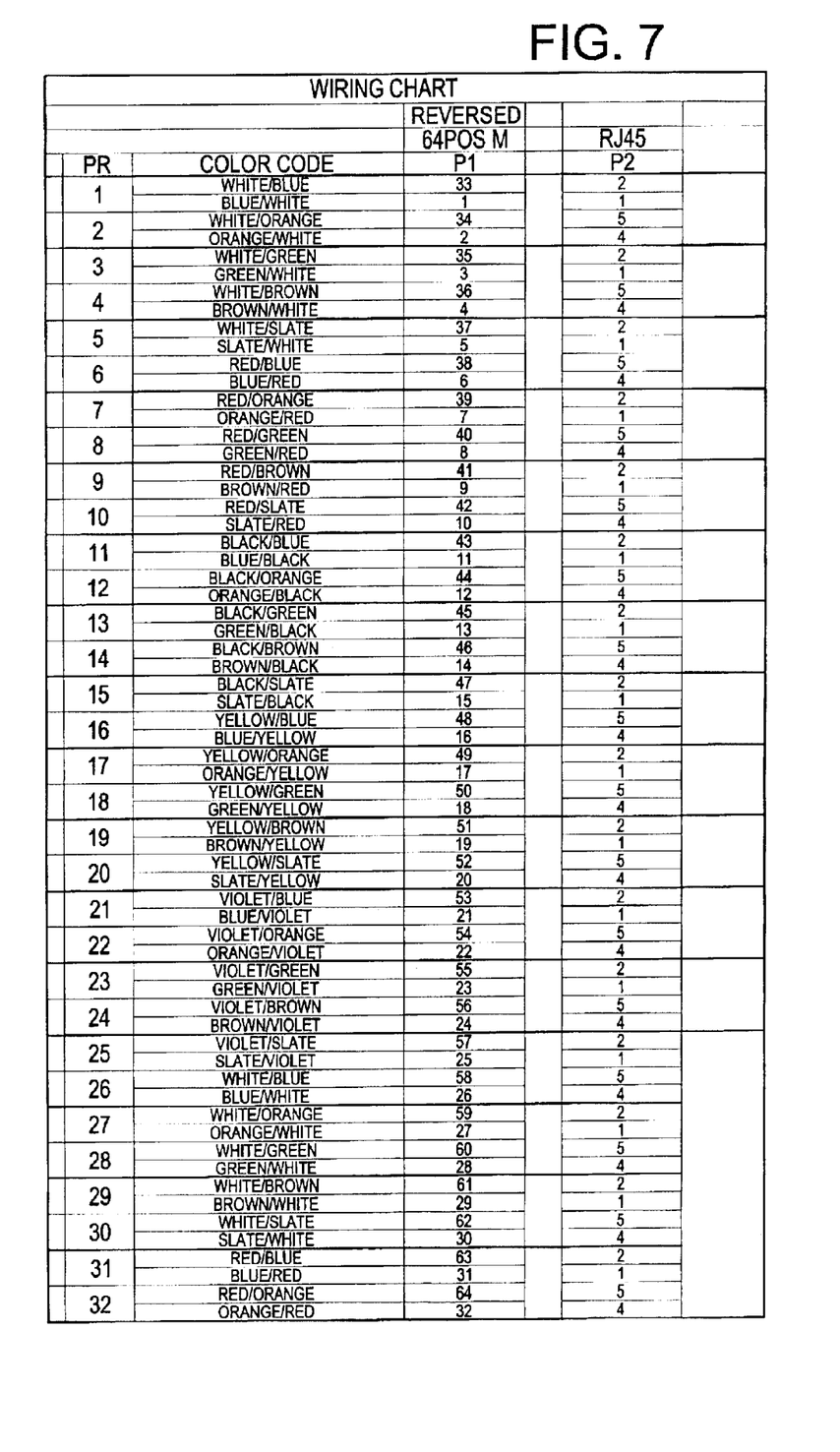
FIG. 7 schematically illustrates an exemplary cable connection provided between the ports on the switching device and the connection terminals on the front side of the connection panel depicted in FIG. 2.

FIG. 7 schematically illustrates the pin-to-pin connection provided by the cables 116 (e.g., a Hydra cable) between the front-side terminals 114 of the connection panel 100 and the thirty-two ports in a column 110 of the switching device 102. Although the schematic representation of FIG. 1 only shows a single cable 116, it will be understood that as many as three cables 116 may be provided to respectively interconnect corresponding columns 110 and front side terminals 114.

Provision of the connection panel 100 disclosed herein allows for convenient and orderly cable installation for switching devices or other types of equipment employing vertically arranged port arrays. The cabling arrangement made possible by the connection panel 100 is particularly helpful during maintenance operations, including for example, occasions when component cards of the switching device 102 are to be replaced. In addition, the separation of incoming and outgoing signal lines on the reverse side 126 of the connection panel 100 minimizes susceptibility to cross-talk. In addition, an alternate exemplary embodiment of the present invention allows for the use of two cables to support thirty-two DS1 circuits, this results in a cost savings of two cables over a patch panel with fifty pin connectors and can lead to the ability to save an increased number of ports.

Various changes in the above-described connection panel may be introduced without departing from the invention. For example, some or all of the female 64-position terminals on the connection panel 100 may be replaced with male terminals having the same layout. It is also contemplated to provide terminals each having more or fewer connectors than sixty-four per terminal, arranged with a layout other than the "telco 64-pin" arrangement shown in FIG. 5, so long as all of the terminals have the same layout. Also, the respective horizontal positions of the terminals could be changed. For instance, the separation between terminals 130 and 134 may be increased or decreased.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A connection panel, comprising:
   a frame member;
   a plurality of first terminals provided on said frame member and arranged in a horizontal row on said frame member, said first terminals all being identical and each said first terminal being a sixty-four position standard type of terminal;
   a plurality of second terminals provided on said frame member and arranged in a horizontal row on said frame member, said second terminals all having a position layout that is the same as a position layout of said sixty-four position standard type of terminal and adapted to be connected to a cable, wherein the cable includes two main plugs for connection to a pair of said second terminals and a plurality of secondary plugs adapted to be received by a switching device; and
   connections disposed within said frame member providing electrical connections between said first terminals and said second terminal.

2. The connection panel of claim 1, wherein each of said first and second terminals is a sixty-four-position female terminal with thirty-two positions in each of two adjacent vertical columns.

3. The connection panel of claim 1, wherein the pair of said first terminals are separated from each other by a horizontal distance that is at least as large as five times the width of said standard type of terminal.

4. The connection panel of claim 1, wherein the pair of said second terminals are separated from each other by a horizontal distance that is at least as large as the width of said standard type of terminal.

5. The connection panel of claim 1, wherein said frame member is arranged for rack-mounting and has a height of approximately 5.25 inches and a width of approximately 23 inches.

6. The connection panel of claim 1, wherein said plurality of first terminals is equal in number to said plurality of second terminals.

7. The connection panel of claim 6, wherein said plurality of first terminals consists of six terminals arranged in one horizontal row and said plurality of second terminals consists of six terminals arranged in one horizontal row.

8. The connection panel of claim 1, wherein all of said first terminals are provided on a first side of said frame member and all of said second terminals are provided on a second side of said frame member.

9. The connection panel of claim 8, wherein said first side of said frame member is an opposite side from said second side of said frame member.

10. A connection panel, comprising:
    a frame member;
    fourteen sixty-four-position telephone company standard terminals provided on a first side of said frame member in a horizontal row;
    fourteen sixty-four-position telephone company standard terminals provided in a horizontal row on a second side of said frame member; and
    connections disposed within said frame member providing electrical connections between said first side terminals and said second side terminals.

11. The connection panel of claim 10, wherein a pair of said first terminals are separated from each other by a horizontal distance that is at least as large as five times the width of said standard type of terminal.

12. The connection panel of claim 10, wherein a pair of said second terminals are separated from each other by a horizontal distance that is at least as large as the width of said standard type of terminal.

13. The connection panel of claim 10, wherein all of said twenty-eight terminals are identical.

14. The connection panel of claim 10, wherein all of said twenty-eight terminals are female terminals.

15. The connection panel of claim 10, wherein said twenty-eight terminals are the only terminals provided on said connection panel.

16. The connection panel of claim 10, wherein said first side of said frame member is an opposite side from said second side of said frame member.

17. The connection panel of claim 10, wherein said frame member is arranged for rack-mounting and has a height of approximately 5.25 inches and a width of approximately 23 inches.

18. A connection panel, comprising:
    a housing having a front side and a rear side different from said front side;

a plurality of first terminals provided on said front side of said housing, said first terminals all being identical and each said first terminal being a sixty-four position standard type of terminal;

a plurality of second terminals provided on said rear side of said housing, said second terminals all having a position layout that is the same as a position layout of said sixty-four position standard type of terminal and adapted to be connected to a cable, wherein the cable includes two main plugs for connection to a pair of said second terminals and a plurality of secondary plugs adapted to be received by a switching device; and connections disposed within said housing providing electrical connections between said first terminals and said second terminals.

19. The connection panel of claim 18, wherein said front side of said housing is an opposite side from said rear side of said housing.

20. The connection panel of claim 18, wherein said housing is arranged for rack-mounting and has a height of approximately 5.25 inches and a width of approximately 23 inches.

21. A connection panel, comprising:

a frame member;

a plurality of first terminals provided on said frame member and arranged in a horizontal row on said frame member, said first terminals all being identical and each said first terminal being a sixty-four position standard type of terminal, wherein a pair of said first terminals are separated from each other by a horizontal distance that is at least as large as five times the width of said standard type of terminal;

a plurality of second terminals provided on said frame member and arranged in a horizontal row on said frame member, said second terminals all having a position layout that is the same as a position layout of said sixty-four position standard type of terminal; and connections disposed within said frame member providing electrical connections between said first terminals and said second terminals.

22. A connection panel, comprising:

a frame member;

a plurality of first terminals provided on said frame member and arranged in a horizontal row on said frame member, said first terminals all being identical and each said first terminal being a sixty-four position standard type of terminal;

a plurality of second terminals provided on said frame member and arranged in a horizontal row on said frame member, said second terminals all having position layout that is the same as a position layout of said sixty-four position standard type of terminal, wherein said plurality of second terminals is equal in number to said plurality of first terminals; and connections disposed within said frame member providing electrical connections between said first terminals and said second terminals.

23. The connection panel of claim 22, wherein said plurality of first terminals consists of six terminals arranged in one horizontal row and said plurality of second terminals consists of six terminals arranged in one horizontal row.

* * * * *